United States Patent [19]

Yamamoto et al.

[11] Patent Number: 5,424,381
[45] Date of Patent: Jun. 13, 1995

[54] ALKYL-SUBSTITUTED POLY(2,2'-BIPYRIDINE-5,5'-DIYL) AND USE THEREOF

[75] Inventors: Takakazu Yamamoto, Yokohama; Tsukasa Maruyama, Tokyo, both of Japan

[73] Assignee: Tokyo Institute of Technology, Tokyo, Japan

[21] Appl. No.: 128,038

[22] Filed: Sep. 29, 1993

[30] Foreign Application Priority Data

Mar. 29, 1993 [JP] Japan .................................. 5-070405

[51] Int. Cl.⁶ ..................... C08F 126/06; C08F 130/04
[52] U.S. Cl. ........................................ 526/265; 526/240
[58] Field of Search ................................. 526/265, 240

[56] References Cited

PUBLICATIONS

T. Yamamoto, Z–H Zhou, T. Kanbara, and T. Maruyama, Chemistry Letters pp. 223–224, 1990.

*Primary Examiner*—Joseph L. Schofer
*Assistant Examiner*—Wu C. Cheng
*Attorney, Agent, or Firm*—Spencer, Frank & Schneider

[57] ABSTRACT

A polymer, including alkyl substituted poly(2,2'-bipyridine-5,5'-diyl) having chemical formulae as follows:

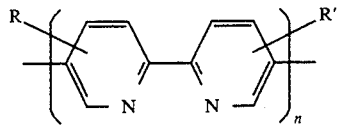

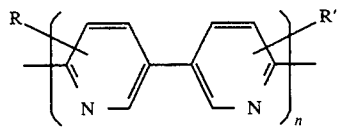

wherein R and R' are H or an alkyl group having not less than 1 carbon atom, except that at least one of R and R' is an alkyl group having not less than 3 carbons, 'n' is a degree of polymerization and is not less than 10. The polymer may be used as a material for a device selected from the group consisting of a battery, an electrochromic device, an electronic device, a n-type conductor and an electroluminescence device, and may be used as polymer ligand to a metal element.

6 Claims, 2 Drawing Sheets

ALKYL-SUBSTITUTED POLY(2,2'-BIPYRIDINE-5,5'-DIYL) AND USE THEREOF

BACKGROUND OF THE INVENTION

1. Technical Field

This invention relates to a novel alkyl-substituted poly(2,2'-bipyridine-5,5'-diyl), a manufacturing process of the same and its applications. The polymer contains bivalent residues selected from alkyl-substituted 5,5'-dihalogenated-2,2'-bipyridine and 6,6'-dihalogenated-3,3'-bipyridine wherein halogen atoms are removed to make the repeating unit. The polymer, which presents a $\pi$-conjugated system along with its principal chain, is conductive after chemical and electrochemical doping process, stable in the air, soluble into various organic solvents, and to be a ligand to metal elements.

2. Background Art

Recently, macromolecular compounds having a $\pi$-conjugated system are appreciated as materials utilizing the electroolytic and optical function. In these macromolecular compounds having the $\pi$-conjugated system, $\pi$ electrons in the system are directed in one dimention along with the principal chain of the macromolecular compounds. Therefore, electrolytic anisotropy and optical anisotropy are shown between one direction along with the principal chain and the other direction perpendicular to said one direction.

It is necessary to orientate the principal chain of the macromolecule in a predetermined direction for utilizing the electrolytic anisotropy and optical anisotropy effectively. However, these macromolecules are stiff, insoluble and hard to melt, because the $\pi$ electrons are directed in one dimension along with the principal chain. Therefore, it is difficult to give a predetermined shape to the macromolecule and to orientate the principal chain in a predetermined direction.

As these conductive materials having the $\pi$-conjugated system along with the principal chain, various compounds such as shown below are known.

Polyacethylene (1)

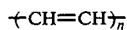

Poly-p-phenylene (2)

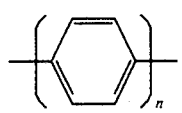

Polythiophene (3)

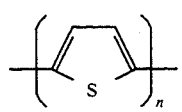

Polypyrrole (4)

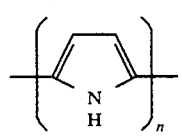

Polypyridine (5)

Polyalkylpyridine (6)

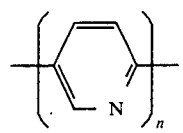

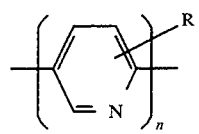

However, because most of the known conductive macromolecules having the $\pi$-conjugated system have a rigid structure and are insoluble to organic solvents etc. and hard to melt, an effective method for processing them has not been found. It is rather difficult to mold and give a predetermined shape to the known macromolecules. Therefore, only limited applications have been found for the macromolecules and the unique functions of them have not been utilized effectively.

To solve the above problems, the attempt has carried out that a substitution group is introduced to the aromatic ring of polythiophene, poly-p-phenylene, polypyrrole or the like for improving the solubility of these compounds to the organic solvents.

Moreover, the above known macromolecules become only p-type conductor by oxidation.

Therefore, it is desired to develop materials having properties not shown in the prior conductive macromolecules by modifying the chemical structures of them. For example, it is desired to develop a $\pi$-conjugated conductive macromolecules indicating n-type conductivity other than p-type conductivity which has already obtained by the prior conductive macromolecules. Such conductive macromolecules indicating n-type conductivity can be used for semiconductor devices.

Also, when a metal element is coordinated with a macromolecular ligand having $\pi$-conjugation conductivity and rigid structure, there is obtained a macromolecular metal complex being in an electric state such that a ligand has a semiconductor-like band structure, that have conventionally been considered impossible; or in a coordinating state such that a coordination is easily turned to be unsaturated state because of the rigidity of the ligand, that have also been considered impossible.

It is easy to obtain a n-type conductor by reducing poly(2,2'-bipyridine-5,5'-diyl) (PBpy) having, for example, the chemical formula 7 as follows:

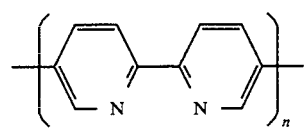

PBpy (7)

Poly(2,2'-bipyridine-5,5'-diyl) has coordinating ability to the metal element owing to the chelate coordination structure as repeating structural unit like 2,2'-bipyridine. However, PBpy is soluble only to limited solvents such as formic acid or concentrated sulfuric acid and therefore its application is very limited. Moreover, the molecular weight of PBpy is not large enough for preparing strong films made of PBpy and therefore application of a PBpy film is very limited Although polyalkylpyridine represented by the above formula 6 has a sufficiently high molecular weight and high solubility to usual organic solvents such as chloroform, etc. and is likely to be reduced to a n-type conductor, it still has such a problem that it is considerably low in coordinating ability with a metal ion on the whole because polyalkylpyridine has an alkylpyridine structure as a repeating unit, that mainly consists of head-to-tail unit.

DISCLOSURE OF INVENTION

Considering these background arts, the inventors of the present invention have searched for a novel conductive macromolecule having a novel molecular structure to solve the above problems.

It is an object of the present invention to provide a novel macromolecule which has a molecular weight large enough for preparing a strong shaped body such as a film an excellent heat-resistivity and solubility to various organic solvents.

It is another object of the invention to provide a novel macromolecule wherein it is possible to control depolarization effect and an electrochemical oxidation-reduction potential.

It is another object of the invention to provide a novel macromolecule which is an effective $\pi$-conjugated polymer liquid to the metal element.

It is another object of the invention to provide a novel macromolecule which may be utilized as a predetermined shape such as a fiber, a film or the like.

It is another object of the invention to provide a novel macromolecule which may be utilized as conductive materials of n-type conductor or the like, materials for batteries, materials for electrochromic devices, materials for electronic devices such as transistors or diodes.

It is another object of the invention to provide a novel macromolecule which may be utilized as an effective $\pi$-conjugated polymer ligand to the metal element or the like.

The inventors directed their attention to poly(2,2'-bipyridine-5,5'-diyl) which has a repeating unit corresponding to one of typical chelate ligands, 2,2'-bipyridine, and as a result of an intense research, they have found that when a long alkyl group such as hexyl group, pentyl group, octyl group, decyl group, dodecyl group, etc. is introduced into a polybipyridine, there is obtained an alkyl group-substituted poly(2,2'-bipyridine-5,5'-diyl) which has sufficiently high molecular weight, heat resistance, and solubility to many usual organic solvents, and is easy to be produced into a film by way of an organic solution thereof. The thus-obtained alkyl group-substituted poly(2,2'-bipyridine-5,5'-diyl) is reduced to n-type conductor and has high coordinating ability to a metal element. The present invention has completed based upon this finding.

The present invention provides poly(2,2'-bipyridine-5,5'-diyl) having the chemical formulae (8) and (9) as follows:

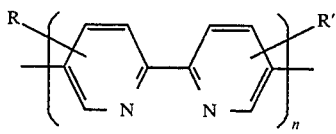
(8)

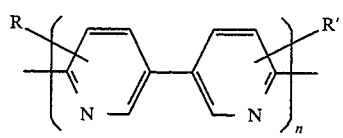
(9)

In the chemical formulae (8) and (9), 'R and R'' are H or an alkyl group having not less than 1 carbon atom, however, at least one of R and R' is an alkyl group having not less than 3 carbons, 'n' is a degree of polymerization and not less than 10. When the degree of polymerization (n) is less than 10, the alkyl substituted poly(2,2'-bipyridine-5,5'-diyl) may lack a substantial function as a polymer. The inventors prepared the alkyl substituted poly(2,2'-bipyridine-5,5'-diyl) of the invention as described below, and confirmed the excellent properties and the applicability of the polymer in experiments described below. As a matter of course, the preparation and the application of the polymer are not limited by the examples.

Moreover, at least one of 'R and R'' is an alkyl group having not less than 3 carbon atoms, for example, hexyl group, pentyl group, octyl group, decyl group, dodecyl group etc. Both 'R and R'' may be an alkyl group having not less than 3 carbon atoms. When one of 'R and R'' may be an alkyl group having not less than 3 carbon atoms, the other may be H or an alkyl group having 1 or 2 carbon atoms. When the number of the carbon atoms in the alkyl group both 'R and R'' are less than 3, the polymer is insoluble to usual organic solvents.

The alkyl substituted poly(2,2'-bipyridine-5,5'-diyl) of the invention contains the above alkyl group (R and/or R'), having a relatively long chain, in the repeating unit of the polymer and therefore have a molecular weight large enough for preparing a strong shaped body such as a film.

Dihalogenated compound may be obtained by the following method.

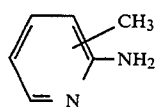
(10)

2-amino-methylpyridine (manufactured by Tokoyo Kasei corporation) having the above formula (10) is reacted with butyllithium and trimethylsilyl chloride in tetrahydrofuran to give the compound having the following formula (11).

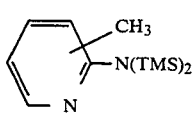
(11)

This compound is then reacted with lithium diisopripylamide and alkyl halide (the alkyl group in the alkyl halide contains carbon atoms not less than 2) in tetrahydrofuran to replace hydrogen of the methyl group in the compound of the formula (11) by the alkyl group (R') in the alkyl halide (R'X).

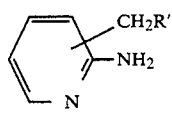 (12)

In the above formula (12), 'R' is an alkyl group having not less than 2 carbon atoms; the N(TMS)₂ group in the above formula (11) is converted to the NH₂ group in the above formula (12) during the work using HCl.

2-amino-alkylpyridine compound as shown in the above formula (12) is then subjected to a first halogenation step using a halogen or a halogen compound in ethanol, sodium hydroxide to obtain 2-amino-5-halogenated-alkylpyridine as shown in the following formula (13).

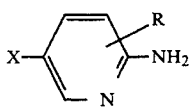 (13)

In the above formula (13), 'R' is an alkyl group having not less than 3 carbon atoms and 'X' is a halogen atom.

2-amino-5-halogenated-alkylpyridine is then subjected to a second halogenation step using a halogen or a halogen compound in hydrogen halide, sodium nitrite, sodium hydroxide to obtain 2,5-dihalogenated alkylpyridine as shown in the formula (14).

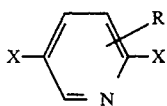 (14)

Then, the halogenated-alkylpyridine having the above formula (14) is reacted with sodium salt of methanethiol salt in benzene under reflux to give 5-halogeno-2-methylsulfenyl-alkyl pyridine having the following formula (15).

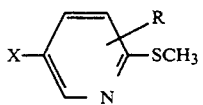 (15)

This compound is then reacted with hydrogen peroxide in acetic acid to give 5-halogeno-2-methyl sulfinyl-alkyl pyridine having the following formula (16).

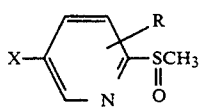 (16)

Then, 5-halogeno-2-methylsulfinyl-alkylpyridine is reacted with ethylmagnesium bromide in tetrahydrofuran to give dihalogenated aromatic compound having the following formula (17) used in the invention, and this compound is reacted with zero-valent nickel complex to give the polymer of the invention.

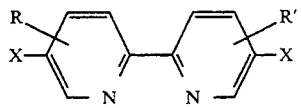 (17)

Moreover, the polymer of the invention may be manufactured by subjecting 5,5'-dihalogenated-2,2'-bipyridine having an alkyl substituents in the 3-, 4- or 6-position of two pyrinediyl groups or 6,6'-dihalogenated-3,3'-bipyridine having an alkyl substituents in the 2-, 4- or 5-position of two pyridinediyl groups to a electrolytic reduction reaction in the presence of a compound containing a transition metal such as nickel, palladium.

Moreover, the polymer of the invention may be manufactured by subjecting 5,5'-dihalogenated-2,2'-bipyridine having alkyl substituents in the 3-, 4- or 6-position of two pyrinediyl groups or 6,6'-dihalogenated-3,3'-bipyridine having alkyl substituents in the 2-, 4-or 5-position of two pyridinediyl groups to a dehalogenation polycondensation reaction by using magnesium (Mg) or zinc (Zn) in the presence of a compound containing a transition metal such as nickel, palladium.

The novel alkyl substituted poly(2,2'-bipyridine-5,5'-diyl) of the invention contains the alkyl group having 3 or more carbon atoms introduced in its pyridine ring. Because of the special effect of the alkyl group having a relatively long carbon-carbon chain, the polymer of the invention has a molecular weight large enough for preparing a strong shaped body such as a film or a fiber, an excellent heat-resistivity, high stability in the air and the solubility to various organic solvents. Therefore, the polymer may be utilized in many application fields wherein the prior art conductive macromolecules are not utilized. It is possible to dissolve the polymer of the invention into the suitable organic solvents for preparing a solution and to obtain a fiber, a film etc. by drying and shaping the solution. Moreover, the polymer of the invention indicates clear color-change by a chemical or electrochemical reduction and become a n-type conductor. Moreover, the polymer may be utilized as polymer ligand to the metal element. Such surprising properties are not shown in the prior art conductive macromolecules.

Then, the polymer of the present invention, which is a π-conjugated conductive macromolecule, can be synthesized easily and in a low cost.

In other words, the novel alkyl substituted poly(2,2'-bipyridine-5,5'-diyl) of the invention, characterized by the excellent properties, can be shaped as a strong fiber or film after dissolving the polymer into the organic solvent. Moreover, the polymer can be reduced by using a reducing agent or by a chemical or electrochemical doping. Therefore, the polymer of the invention may be utilized as materials for batteries, materials for electrochromic devices, materials for electronic devices such as transistors or diodes, conductive materials of n-type conductor, and polymer ligand to the metal element or the like.

DETAILED DESCRIPTION OF THE INVENTION

Figure 1:
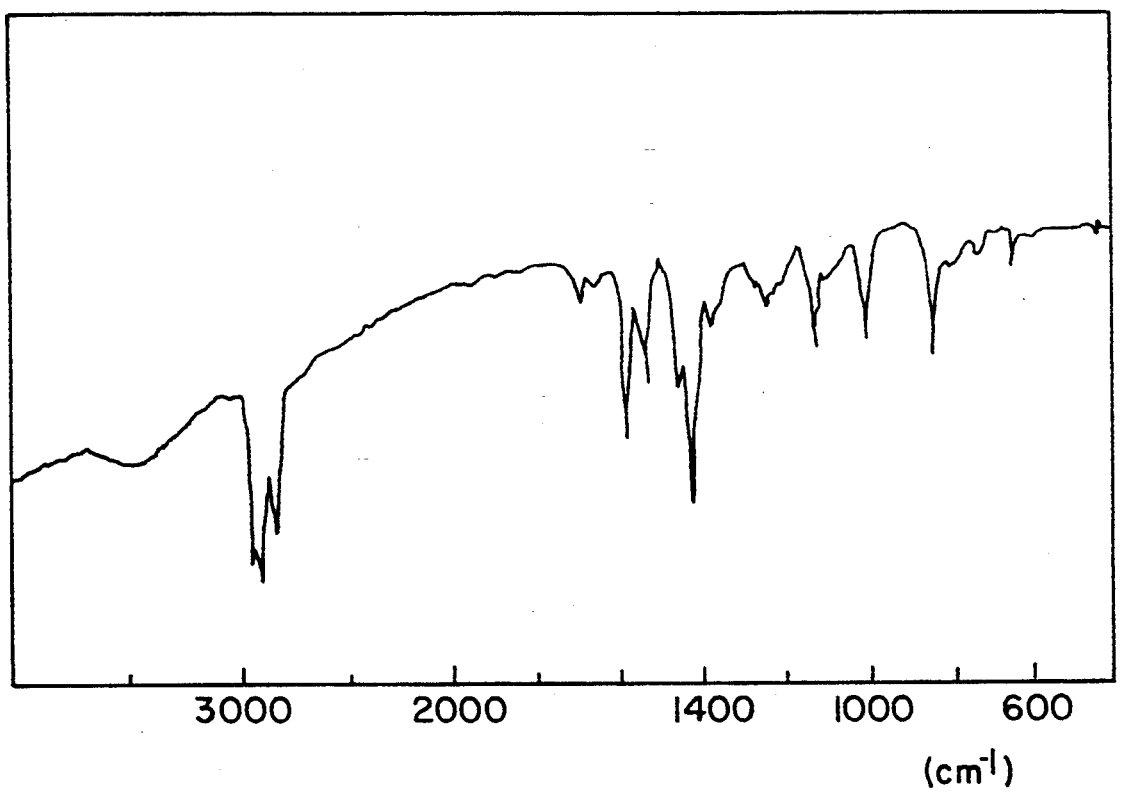
FIG. 1 is a chart showing an infrared absorption spectrum of an example of the polymer according to the invention.

The alkyl substituted poly(2,2'-bipyridine-5,5'diyl) according to the present invention can be obtained by reacting an alkyl substituted 5,5'dihalogenated 2,2'bipyridine, with an equimolar amount or excess of a zero-valent nickel compound added thereto in an organic solvent, followed by dehalogenation. A preferable reaction temperature ranges between room temperature and boiling point of the solvent. The reaction completes within about 1~48 hours. As the above organic solvent, for example, N,N-dimethylformamide, acetonitrile, toluene, tetrahydrofuran or the like can be employed.

The zero-valent nickel compound withdraws halogens from halogenated aromatic compounds and causes a coupling reaction between the aromatic groups [for example, "Synthesis", p.736 (1984)]. This reaction is represented by the following equation (18):

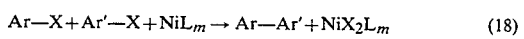

$$Ar-X + Ar'-X + NiL_m \rightarrow Ar-Ar' + NiX_2L_m \quad (18)$$

wherein Ar and Ar' represent an aromatic group, X represents a halogen atom, L represents a neutral ligand and hence $NiL_m$ represents a zero-valent nickel compound.

Accordingly, if an aromatic compound having two halogens in the molecule, such as alkyl substituted 5,5'-dihalogenated-2,2'-bipyridine, is reacted with an equimolar or excess of a zero-valent nickel compound, the polymer of the present invention can be obtained by the dehalogenation polycondensation reaction shown in the following equations (19) and (20):

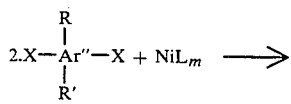

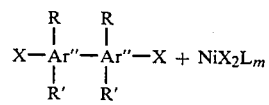

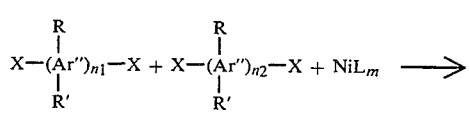

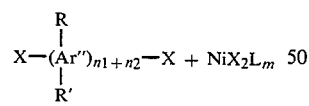

wherein $X-\underset{R'}{\overset{R}{Ar''}}-X$ (21)

represents an alkyl substituted 5,5'-dihalogenated-2,2'-bipyridine, R and R' are H or an alkyl group having not less than 1 carbon atom, however, at least one of R and R' represents a long chain alkyl group having not less than 3 carbon atoms and, where X is a halogen.

In the above-described reaction, as the zero-valent nickel compound, those synthesized in a reaction system, so to speak, in situ, immediately before conducting a polymerization reaction can be used directly. Alternatively, preliminarily synthesized and isolated ones also can be used. Such a zero-valent nickel compound is, for example, a nickel complex produced by a reduction reaction or a ligand interchange reaction in the presence of a neutral ligand. As a typical example of the neutral ligand, mention may be made of 1,5-cyclooctadiene, 2,2'-bipyridine, triphenylphosphine or the like.

Alternatively, the alkyl substituted poly (2,2'-bipyridine-5,5'-diyl) can be obtained by another process wherein the alkyl substituted 5,5'-dihalogenated-2,2'-bipyridine shown in the above chemical formula (17) undergoes a dehalogenation reaction when it is subjected to an electrochemical reduction reaction in the presence of a divalent nickel compound. Namely, when a divalent nickel compound is electrochemically reduced in an electrolytic cell, a zero-valent nickel compound is produced by the reaction shown in the following chemical formula (22).

$$[Ni^{II}L_m]^{2+} + 2e \rightarrow Ni^0L_m \quad (22)$$

Accordingly, when an aromatic compound having two halogens in the molecule, namely, an alkyl substituted 5,5'-dihalogenated-2,2'-bipyridine is electrochemically reduced in the presence of a divalent nickel compound, the polymer of this invention can be obtained according to the reaction shown in the chemical formula (22) and the reactions shown in the following formulae (23)-(25) consequently taking place, wherein the $Ni^0L_m$ producing in the reaction system is involved.

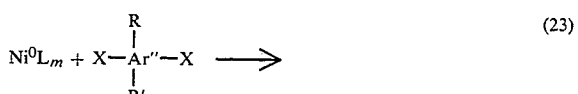

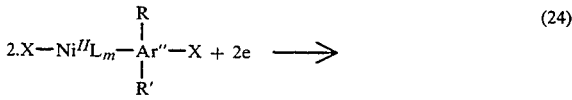

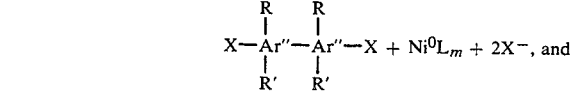

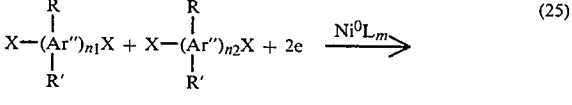

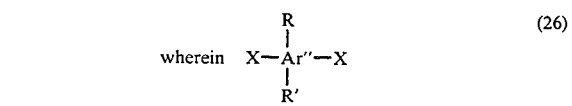

represents an alkyl substituted 5,5'-dihalogenated-2,2'-bipyridine, R and R' are H or an alkyl group having not less than 1 carbon atom, however, at least one of R and R' represents a long chain alkyl group having not less than 3 carbon atom and, where K is a halogen.

The electrolysis may be conducted generally in the following conditions: namely, polar solvents such as N,N-dimethylformamide and acetonitrile are used as the solvent, salts such as tetraethylammonium perchlorate and tetraethylammonium tetrafluoroborate as the supporting electrolytic salt are dissolved to prepare an electrolyte and electrodes such as platinum electrode, ITO tranparent electrode and graphite electrode are employed as the electrode. The alkyl substituted 5,5'-dihalogenated-2,2'-bipyridine and divalent nickel complex are dissolved in the electrolyte and the electrochemical reduction is conducted at a reduction potential of the divalent nickel complex, for example, at $-1.7V$ vs $Ag/AG^+$ in the case of tris(2,2-bipyridine)-nickel(III) salt.

Moreover, in another method, alkyl substituted poly(2,2'-bipyridine-5,5'-diyl) having the chemical formula (8) may be manufactured by subjecting alkyl substituted 5,5'-dihalogenated-2,2'-bipyridine to a dehalogenation polycondensation reaction by using magnesium or zinc in the presence of a divalent nickel compound. In other words, zero-valent nickel compound may be prepared by a reducing reaction with magnesium or zinc and the polymerization reaction is eventually expressed as shown in the formula (27).

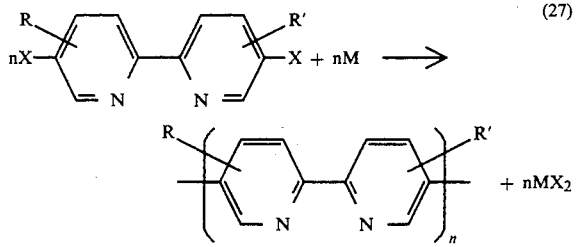

(27)

Therefore, the polymer having the chemical formula 8 can be obtained by reducing an alkyl substituted 5,5'-dihalogenated-2,2'-bipyridine, with an equimoler amount or excess of a Mg or Zn is the presence of a divalent nickel compound, as shown in the formula (22) and followed by the formulae (19)–(21).

The above nickel compounds which have been synthesized and isolated prior to the polymerization reaction can be used. Alternatively, those synthesized from nickel or a nickel compound in an electrolytic cell can be used directly as they are in the cell. As such a nickel compound, mention may be made of, for example, tris(2,2'-bipyridine)nickel(II) dibromide [Ni(bpy)$_3$]Br$_2$, dibromobis(triphenylphosphine)nickel(II)[-Ni(PPh$_3$)$_2$]Br$_2$ or the like.

There is no limit to these polymerization reaction conditions, however, from a point of raising a yield and molecular weight, it is preferable that polymerization is carried out in substantial no water and no oxygen conditions. concretely and detailedly by way of example hereinafter.

Next, it will be explained the metal coordinating function of the polymer of the present invention. In general, pyridine and 2,2'-bipyridine are chelate ligands that can be coordinated with a metal element via a pair of unpaired electrons of nitrogen in the ring. Coordinating ability and stability of coordinated product of 2,2'-bipyridine are greater than those of pyridine.

Polyalkylpyridine includes a head-to-tail unit and head-to-head (tail-to-tail) unit, and mainly consisted of head-to-tail unit. This means that the polyalkylpyridine is a ligand of pyridine-type and therefore, the coordinating ability with a metal ion is generally low.

On the other hand, alkyl substituted poly(2,2'-bipyridine-5,5'-diyl) consists only of head-to-head (tail-to-tail) unit and classified into a bipyridine-type ligand. Accordingly, this polymer has a coordinating ability with a metal ion, etc. and can perform a function as a polymer ligand to a metal element.

The polymer of the present invention coordinated with a metal element is especially useful as a conductive polymer catalyst.

EXAMPLE 1

0.99 g of a bis(1,5-cyclooctadiene) nickel complex (Ni(cod)$_2$) (3.6 mmol) was dissolved in 30 ml of N,N-dimethylformamide (hereinafter referred to as "DMF"), and 0.56 g of 2,2'-bipyridine (bpy) (3.6 mmol) and 0.39 g of 1,5-cyclooctadiene (cod) (3.6 mmol) were added thereto. To this solution was dropped 1.45 g of 6,6'-dihexyl-5,5'-dibromo-2,2'-bipyridine (3.0 mmol dissolved in 20 ml of a DMF solution, thereafter reacted at a reaction temperature of 60° C. for 48 hours, and polymerized. As a polymerization proceeds, there was produced an ocher-colored precipitate of an alkyl substituted poly(2,2'-bipyridine-5,5'-diyl) polymer. After completion of the reaction, the precipitate was filtered and recovered, and washed with the use of the following materials (a) to (e) several times, and the polymer was refined. (a) ammonia water (29%), (b) methyl alcohol, (c) a warm aqueous solution of sodium ethylenediaminetetraacetic acid (prepared to pH=3), (d) warm water and (e) methyl alcohol.

After washed, the precipitate was vacuum-dried to obtain 0.40 g of ocher-colored powder of alkyl substituted poly(2,2'-bipyridine-5,5'-diyl). A yield of the polymer was 80%.

The infrared absorption spectrum of this polymer is shown in FIG. 1. There is observed absorption derived from C—H stretching vibration of a pyridine ring at 3030 cm$^{-1}$, C—H stretching vibration by a side chain hexyl group at 2850–2950 cm$^{-1}$, skeletal vibration of a pyridine ring and deformation vibration of a side chain methylene group at 1580, 1530, 1460 and 1420 cm$^{-1}$, and C—H out-of-plane deformation vibration of a pyridine ring at 830 cm$^{-1}$.

Figure 2:
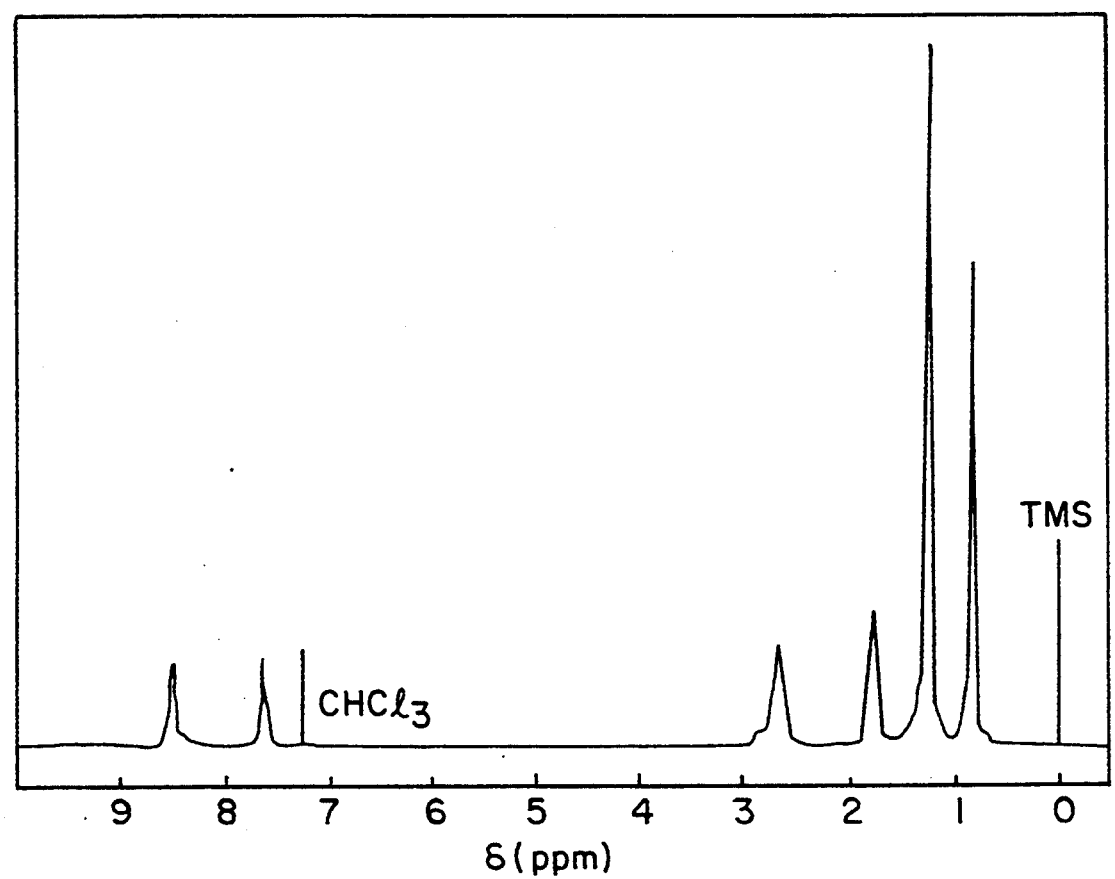
FIG. 2 is a chart showing a proton NMR spectrum of an example of the polymer according to the invention.

Moreover, FIG. 2 shows $^1$H-NMR in CDCl$_3$ of the polymer. There is observed absorption derived from a side chain hexyl group at δ=0.8–3.0 ppm (inside standard: tetramethylsilane) and hydrogen of a pyridine ring at δ=7.6–8.5 ppm. An area ratio of respective peaks was about 13:2. Moreover, element analysis values of the obtained polymer were 81.0% of carbon, 8.8% of hydrogen, 8.7% of nitrogen and 0.0% of bromine.

The result of the infrared absorption spectrum $^1$H-NMR and element analysis supports that the polymer has the following structure.

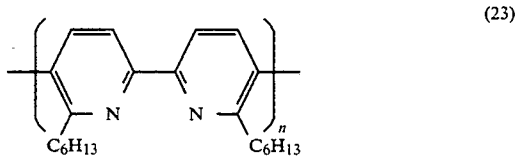

(23)

where, n shows a degree of polymerization.

Poly(2,2'-bipyridine-5,5'-diyl) was only soluble in formic acid as an organic solvent, while the above polymer has a long-chain alkyl group as a side chain, so that it was soluble in not only formic acid but also general organic solvents shown below. That is, the polymer was soluble in chloroform (solubility of about 300 mg/ml), tetrahydrofuran (THF) (solubility of about 300 mg/ml), benzene (solubility of about 300 mg/ml), toluene (solubility of about 300 mg/ml), cresol and N-methylpyrrolidone (NMF), and partly soluble in diethyl ether. A cast film was tried to prepare from a formic acid solution of poly(2,2'-bipyridine-5,5'-diyl), but a strong film could not be obtained, while a cast film was prepared from said solution of the present polymer, and a strong and ocher-colored free standing film was obtained.

When a molecular weight of this polymer was measured in a formic acid solution by a light scattering method, a weight-average molecular weight was 37000 (degree of polymerization 110) which was higher than the weight-average molecular weight 3200 (degree of polymerization 21) of poly(2,2'-bipyridine-5,5'-diyl). Moreover, in case of measuring the molecular weight, even when a chloroform solution was used as solvent instead of formic acid, the weight-average molecular weight observed in chloroform was substantially the same as that observed in formic acid.

The ultraviolet visible absorption spectrum of said polymer showed a sharp $\pi$-$\pi$* transition absorption peak at about 350 nm in a formic acid solution and at about 320 nm in either one of a chloroform, THF, benzene, toluene or NMP solution. Moreover, said polymer showed a high thermal stability.

As a result of thermogravimetric analysis under nitrogen, weight reduction was observed from the proximity of 300° C. and was about 45% at 900° C.

EXAMPLE 2

A chloroform solution of the poly(6,6'-dihexyl-2,2'-bipyridine-5,5'-diyl) obtained in Example 1 was applied onto a platinum plate, and chloroform was removed to prepare a film of the polymer. With respect to this polymer film, cyclic voltammogram was measured in an acetonitrile solution containing 0.1 mol/l of $[(C_2H_5)_4N][ClO_4]$. As a result, it was found in the polymer that a cation is doped (n-type doping) for Ag/Ag+ at about $-2.5$ V, and dedoped at about $-2.4$ V (potential for Ag/Ag+) in sweeping in the reverse direction. In case of doping, the color of the polymer film was changed from ochre to deep red orange, and in case of dedoping, discoloration went by contraries.

Thus, the present polymer is possible to be electrochemically reduced, that is, electrochemical n-type doping, and together with doping, electrochromic property was shown. It is shown from the above that the present polymer represents n-type conductive character and is usable as battery electrode material and electrochromic element material.

EXAMPLE 3

A formic acid solution and a chloroform solution of poly(6,6'-dihexyl-2,2'-bipydine-5,5'-diyl) obtained in the example 1 were prepared. The polymer was contained in each solution in a concentration of $2.0 \times 10^{-5}$ mol/l of its unit structure. Fluorescence spectra were measured about the solutions at an excitation wavelength of 310 nm. As a result, luminescence was observed at 420 nm in the formic acid solution and at 360 nm in the chloroform solution.

As described above, the polymer is capable of radiating fluorescence. Therefore, the polymer may be utilized as a material for an electroluminescence device.

EXAMPLE 4

15 mg of alkyl substituted poly(2,2'-bipyridine-5,5'-diyl) obtained in Example 1 was added to 5 ml of toluene solution of 10 mg of Ni(cod)$_2$, and the resulting solution was subjected to a reaction at 30° C. to obtain a nickel complex. Before the addition of alkyl substituted poly(2,2'-bipyridine-5,5'-diyl), the color of the toluene solution was yellow and after the addition, color of the solution changed from yellow to dark green as time passed. Also, the color change of the solution was examined by a UV-visible spectrophotometer and the absorption peak was observed around 600–650 nm due to the formation of nickel complex. Further, it was found that the absorption peak at 600–650 nm gradually increased with the reaction time. With respect to the reactions with other transition-metal compounds, it is observed the color change characteristic of complex formation when a complex was formed. Accordingly, it is understood that the polymer of the present invention is easily coordinated with a metal element and functions as a polymer ligand.

EXAMPLE 5

An alkyl substituted poly(2,2'-bipyridine-5,5'-diyl) (30 mg) obtained in Example 1 was reacted with the material having the ability to quaternize the pyridine ring (for example, $(CH_3O)_2SO_2$, $CH_3I$ and the like) to obtain the quaternized material. The obtained polymer was complete soluble to the polar solvent such as methanol, ethanol and the like.

EXAMPLE 6

2.4 g of 6,6'-dihexyl-5,5'-dibromo-2,2'-bipyridine (5.0 mmol) was dissolved into 15 ml of tetrahydrofuran (THF), 0.13 g of a piece of metal magnesium (5.5 mmol) was added into the resulting solution. After the solution was heated and refluxed for 10 hours, dichloro [1,2-bis (diphenylphosphino) ethane] nickel(II) NiCl$_2$ (dpe) (5 mg, 0.01 mmol) was added into the heated solution, which was then heated and refluxed for 13 hours. After the reaction was completed, the reaction solution was poured into diluted hydrochloric acid containing ices, the resulting mixture was neutralized by adding water containing Na$_2$CO$_3$. The polymer was recovered by filtration and was washed with water and ether, and further washed with warm water solution containing ethylenediaminetetraacetic acid disodium salt. The resulting polymer was then vacuum dried and 0.50 g of alkyl substituted poly(2,2'-bipyridine-5,5'-diyl), was obtained. The yield of the polymer was 60%.

EXAMPLE 7

2.4 g of 6,6'-dihexyl-5,5'-dibromo-2,2-bipyridine (5.0 mmol) was dissolved into 5 ml of hexamethylphosphoric triamide (HMPA), a powder of zinc (0.98 g, 15 mmol) was added into the resulting solution which was then heated to 100° C. Then, 60 mg of dibromo [1,2-bis (diphenylphosphino ethane] nickel(II) NiBr$_2$ (dpe) (0.1 mmol) was added into the heated solution and reacted at 140° C. for 17 hours. After the reaction was completed, the reaction solution was poured into diluted hydrochloric acid containing ices, the resulting mixture was alkalified by adding ammonia water and the polymer was recovered by filtration.

The above polymer was washed with methyl alcohol, water solution containing ethylenediamine tetraacetic acid disodium salt and then vaccum dried. 0.40 g of alkyl substituted poly(2,2'-bipydine-5,5'-diyl) was obtained.

EXAMPLE 8

0.3 mmol of 6,6'-dihexyl-5,5'-dibromo-2,2'-bipyridine, 0.15 mmol of tris (2,2'-bipyridine) nickel(II) bromide ([Ni(bpy)$_3$]Br$_2$) and 3.75 mmol of tetraethylammonium perchrolate ([(C$_2$H$_5$)$_4$N][ClO$_4$]) were dissolved into N,N-dimethylformamide to prepare an electrolytic solution. This solution was filled into an electrolytic bath in which a platinum plate (1×2 cm=2 cm$^2$) was arranged as an anode and a silver electrode was arranged as a reference electrode. Then, an electrolytic polymerization was carried out at a polymerization temperature of 60° C., at an electrolytic potential of −1.7 V (the potential was for Ag/Ag+ which is same in the following description) and for 16 hours to provide a film consisting of a ocher-colored polymer on the anode. This crude polymer was collected and purified using the following substances (a) to (e) by washing the polymer with the substances (a) to (e) in the following order, the crude polymer was washed several times by each substance.

(a) water containing ammonia (29%), (b) methyl alcohol, (c) warm water solution containing ethylenediaminetetraacetic acid disodium salt (its pH was 3), (d) warm water, (e) methyl alcohol.

After the above washing step, the polymer was vacuum dried and ocher-colored alkyl substituted poly(2,2'-bipyridine-5,5'-diyl) was obtained.

What is claimed is:

1. A polymer, comprising:
alkyl substituted poly(2,2'-bipyridine-5,5'-diyl) having chemical formulae as follows:

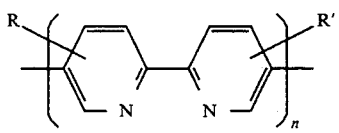

-continued

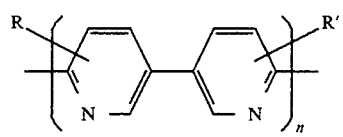

wherein R and R' are H or an alkyl group having not less than 1 carbon atom, except that at least one of R and R' is an alkyl group having not less than 3 carbons, 'n' is a degree of polymerization and is not less than 10.

2. A polymer, comprising:
alkyl substituted poly(2,2'-bipyridine-5,5'-diyl) having chemical formulae as follows:

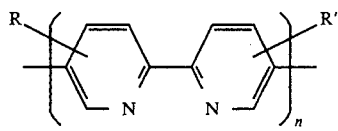

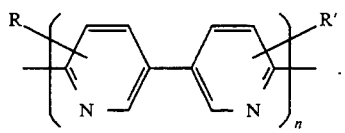

wherein R and R' are H or an alkyl group having not less than 1 carbon atom, except that at least one of R and R' is an alkyl group having not less than 3 carbons, 'n' is a degree of polymerization and is not less than 10, and
wherein at least one of R and R' is an alkyl group selected from the group consisting of a hexyl group, a pentyl group, and octyl group, a decyl group and a dodecyl group.

3. The polymer as claimed in claim 1, which is used as a material for a device selected from the group consisting of a battery, an electrochromic device, an electronic device, a n-type conductor and an electroluminescence device.

4. The polymer as claimed in claim 1, which is used as a polymer ligand to a metal element.

5. The polymer as claimed in claim 2, which is used as a material for a device selected from the group consisting of a battery, an electrochromic device, an electronic device, a n-type conductor and an electroluminescence device.

6. The polymer as claimed in claim 2, which is used as a polymer ligand to a metal element.

* * * * *